(12) United States Patent
Tanaka (10) Patent No.: US 11,599,313 B2
(45) Date of Patent: Mar. 7, 2023

(54) INFORMATION PROCESSING APPARATUS AND IMAGE PROCESSING APPARATUS

(71) Applicant: FUJIFILM Business Innovation Corp., Tokyo (JP)

(72) Inventor: Kohei Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 252 days.

(21) Appl. No.: 16/563,941

(22) Filed: Sep. 9, 2019

(65) Prior Publication Data
US 2020/0089442 A1    Mar. 19, 2020

(30) Foreign Application Priority Data

Sep. 19, 2018   (JP) .............................. JP2018-175456

(51) Int. Cl.
G06F 3/12    (2006.01)
H04N 1/00    (2006.01)

(52) U.S. Cl.
CPC .......... G06F 3/1225 (2013.01); G06F 3/1203 (2013.01); H04N 1/00952 (2013.01); H04N 1/00965 (2013.01); H04N 2201/0094 (2013.01)

(58) Field of Classification Search
CPC combination set(s) only.
See application file for complete search history.

(56) References Cited

U.S. PATENT DOCUMENTS 9,875,073 B2    1/2018  Homma
10,423,367 B1*  9/2019  Yamamoto .............. G06F 3/126
2005/0225789 A1* 10/2005 Ferlitsch ................ G06F 3/1245
                                                    358/1.13
2010/0071069 A1*  3/2010 Sugiura .................. G06F 21/105
                                                    726/26
2014/0104638 A1*  4/2014 Kato ..................... H04N 1/4426
                                                    358/1.14
2015/0099502 A1*  4/2015 Park ....................... G06F 3/1292
                                                    358/1.14
2015/0178741 A1   6/2015 Ono et al.
2016/0062801 A1*  3/2016 Hatano .................. G06F 9/5011
                                                    718/104
2016/0253128 A1*  9/2016 Mori ...................... G06F 3/1298
                                                    358/1.15
2017/0026534 A1*  1/2017 Kinoshita .......... H04N 1/00127
2017/0078520 A1*  3/2017 Kobayashi ............ G06F 3/1204
(Continued)

FOREIGN PATENT DOCUMENTS

| JP | 2009294716 | 12/2009 |
| JP | 2015135663 | 7/2015 |
| JP | 2017061079 | 3/2017 |

OTHER PUBLICATIONS

"Office Action of Japan Counterpart Application" with English translation thereof, dated Jul. 19, 2022, p. 1-p. 5.

*Primary Examiner* — Helen Zong
(74) *Attorney, Agent, or Firm* — JCIPRNET (57) ABSTRACT

An information processing apparatus includes one or plural first plug-ins that are prepared according to a type of a data output apparatus for outputting data and collect data output from the data output apparatus, one or plural second plug-ins that receive data from the first plug-in and transmit the received data to an external apparatus, and a plug-in management unit that controls activation and stop of the first plug-in and the second plug-in.

18 Claims, 7 Drawing Sheets

(56) References Cited

U.S. PATENT DOCUMENTS

| | | | |
|---|---|---|---|
| 2019/0230242 A1* | 7/2019 | Minami | G06F 16/116 |
| 2019/0235815 A1* | 8/2019 | Takagi | G06F 3/1285 |
| 2019/0265931 A1* | 8/2019 | Kasahara | G06F 3/1294 |
| 2019/0272135 A1* | 9/2019 | Nakamura | G06F 3/1204 |
| 2019/0324833 A1* | 10/2019 | Kobayashi | G06F 3/1285 |
| 2020/0310724 A1* | 10/2020 | Ah | G06F 3/1289 |
| 2021/0014366 A1* | 1/2021 | Nakashima | H04N 1/32122 |

* cited by examiner

INFORMATION PROCESSING APPARATUS AND IMAGE PROCESSING APPARATUS

CROSS-REFERENCE TO RELATED APPLICATIONS

This application is based on and claims priority under 35 USC 119 from Japanese Patent Application No. 2018-175456 filed Sep. 19, 2018.

BACKGROUND

(i) Technical Field

The present invention relates to an information processing apparatus and an image processing apparatus.

(ii) Related Art

There is a service (managed print service (MPS)) that analyzes job logs accumulated in an image forming apparatus and proposes the number of image forming apparatuses or the type of image forming apparatus according to the situation of use. JP2015-135663A discloses a technique in which logs are recorded in each image processing apparatus and collected by a server. Today, a new function is given to an apparatus by providing a plug-in.

SUMMARY

However, since the function to be given varies depending on the purpose of use of the apparatus or the use environment, it is required to flexibly respond to the addition of various functions.

Aspects of non-limiting embodiments of the present disclosure relate to an information processing apparatus and an image processing apparatus for reducing the cost in the case of additionally providing various functions as compared with a configuration in which a function of collecting information and transmitting the information to a server is provided by one plug-in.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: one or a plurality of first plug-ins that are prepared according to a type of a data output apparatus for outputting data and collect data output from the data output apparatus; one or a plurality of second plug-ins that receive data from the first plug-in and transmit the received data to an external apparatus; and a plug-in management unit that controls activation and stop of the first plug-in and the second plug-in.

BRIEF DESCRIPTION OF THE DRAWINGS

Exemplary embodiment(s) of the present invention will be described in detail based on the following figures, wherein:

FIG. 7 is a flowchart showing the operation of a plug-in control unit at the time of executing a plug-in.

DETAILED DESCRIPTION

Hereinafter, an exemplary embodiment of the present invention will be described in detail with reference to the accompanying drawings.

System Configuration

Figure 1:
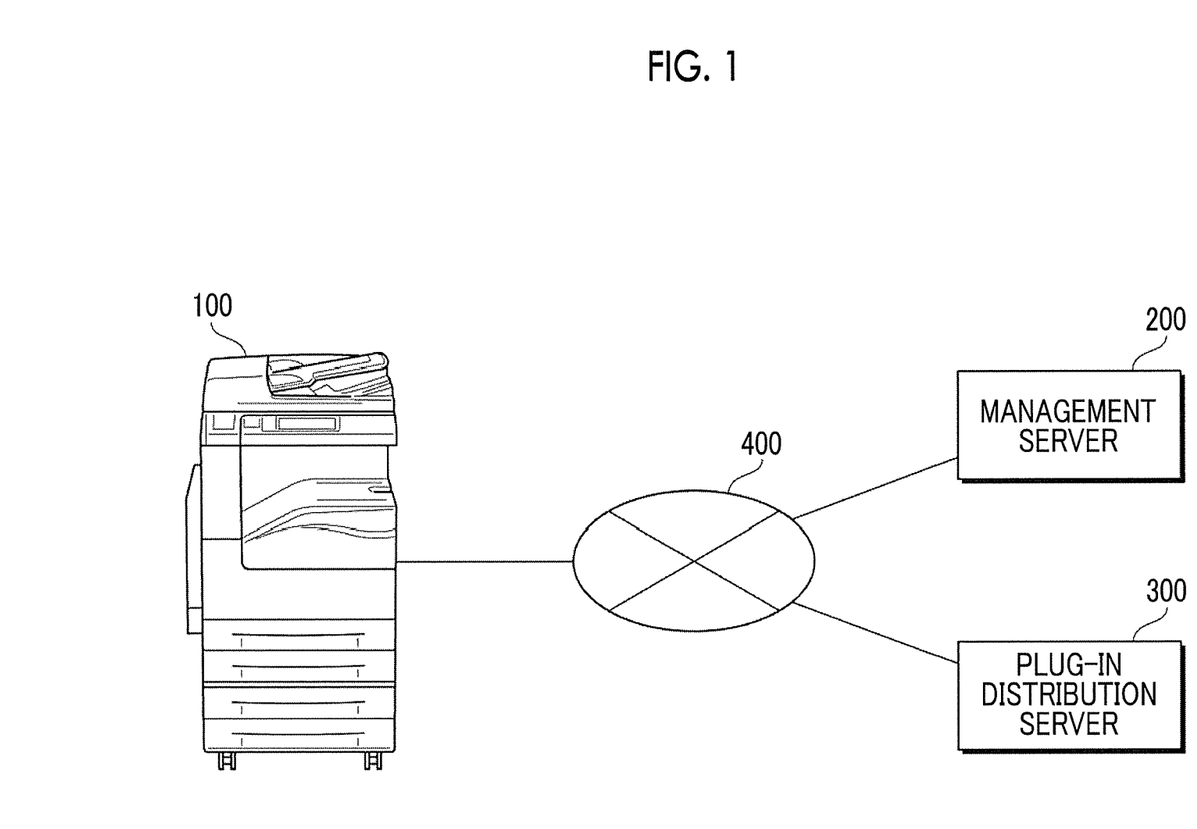
FIG. 1 is a diagram showing the overall configuration of an information processing system to which the present exemplary embodiment is applied.

FIG. 1 is a diagram showing the overall configuration of an information processing system to which the present exemplary embodiment is applied. The information processing system includes an image processing apparatus 100 as an example of an information processing apparatus, a management server 200, and a plug-in distribution server 300. The image processing apparatus 100, the management server 200, and the plug-in distribution server 300 are connected to each other through a network 400.

The image processing apparatus 100 is an apparatus that inputs and outputs images and performs processing or communication of images converted into data. The image processing apparatus 100 collects data acquired by itself or an external apparatus, and transmits the collected data to the management server 200. The image processing apparatus 100 is an apparatus that can add or extend a function by adding a plug-in (program).

The management server 200 is a server that receives and stores the data collected by the image processing apparatus 100 and performs various kinds of data processing, such as statistical processing, using the received data. The plug-in distribution server 300 is a server that provides a plug-in to add a function to the image processing apparatus 100.

The network 400 is not particularly limited as long as the network 400 is a communication network used for data communication between apparatuses, and may be, for example, a local area network (LAN), a wide area network (WAN), or the Internet. The communication line used for data communication may be wired or wireless, and these may be used in combination. Alternatively, a relay device, such as a gateway device or a router, may be used so that respective apparatuses are connected to each other through a plurality of networks or communication lines.

Configuration of Image Processing Apparatus

Figure 2:
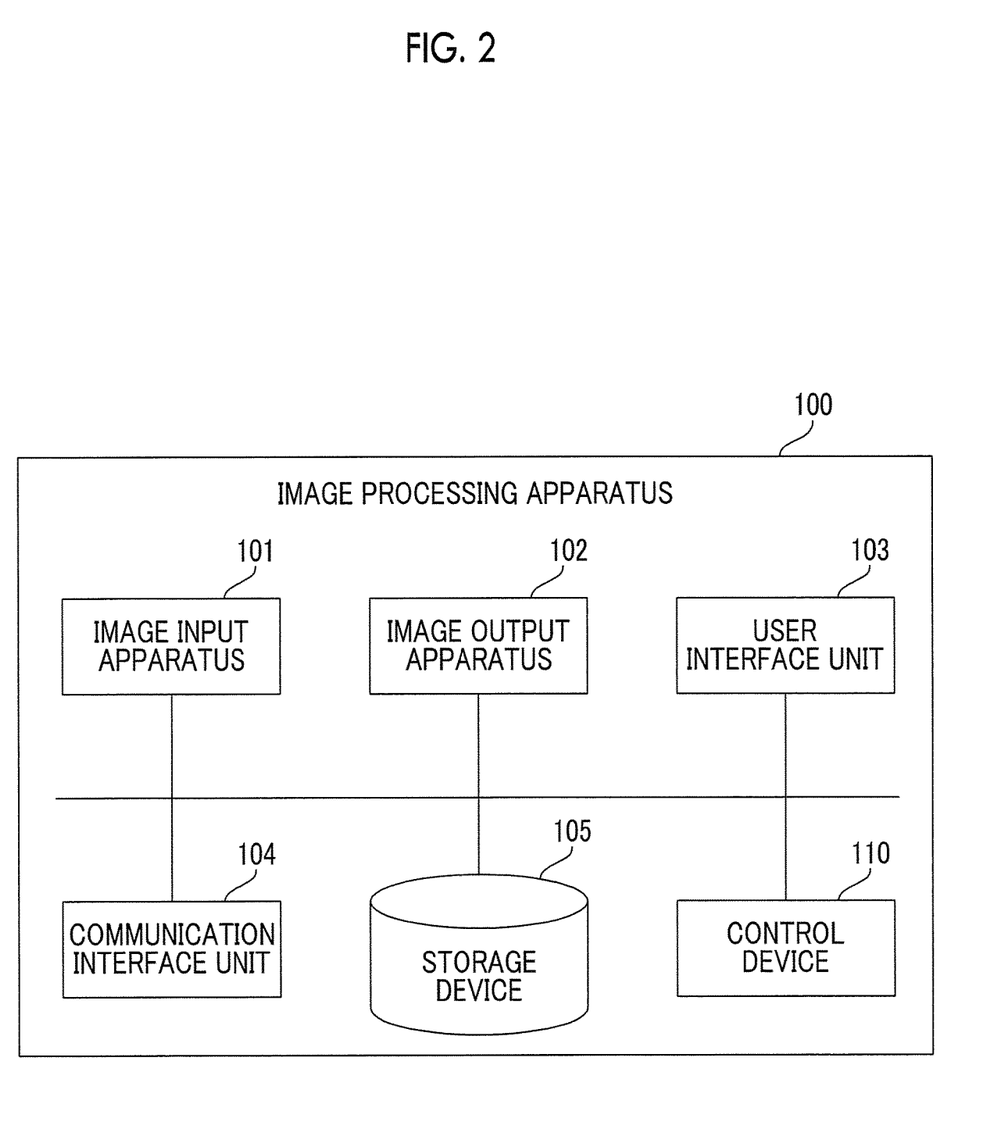
FIG. 2 is a diagram showing the configuration of an image processing apparatus.

FIG. 2 is a diagram showing the configuration of the image processing apparatus 100. The image processing apparatus 100 includes an image input apparatus 101, an image output apparatus 102, a user interface unit 103, a communication interface unit 104, a storage device 105, and a control device 110.

The image input apparatus 101 is an image input terminal (IIT). The image input apparatus 101 is, for example, a so-called scanner apparatus, and optically reads an image on a set document and generates a read image (image data). Examples of an image reading method include a charge coupled device (CCD) method in which reflected light with respect to light emitted to a document from a light source is reduced by a lens and received by the CCD or a contact image sensor (CIS) method in which reflected light with respect to light sequentially emitted to a document from a light emitting diode (LED) light source is received by the CIS.

The image output apparatus 102 is an image output terminal (IOT). The image output apparatus 102 is a so-called printer apparatus, and forms an image based on image data on a sheet, which is an example of a recording material, using an image forming material. Examples of a method of forming an image on a recording material include an electrophotographic method in which an image is formed by transferring toner adhering to a photoreceptor onto a recording material and an inkjet method in which an image is formed by discharging ink onto a recording material.

The user interface (UI) unit 103 includes display means that displays a screen, such as an operation screen or an information presentation screen, and input means through which an input operation by an operator is performed. By performing an input operation using the input means according to the operation screen displayed on the display means, various kinds of control commands or control data are input. As the display means, for example, a liquid crystal display is used. As the input means, for example, a hardware key or a touch sensor is used. As an example, a touch panel may be used in which a liquid crystal display as display means and a touch sensor as input means are combined.

The communication interface unit 104 is connection means for making a connection with an external apparatus, such as the management server 200 or the plug-in distribution server 300, through the network 400 in order to exchange data. Although not particularly distinguished, depending on the type of communication means, a network port of Ethernet (registered trademark), a universal serial bus (USB) port, a wireless communication apparatus for wireless LAN connection or connection based on Bluetooth (registered trademark), and the like are provided. The communication interface unit 104 is an example of a reception unit.

The storage device 105 is a device that stores image data used in the image input apparatus 101 or the image output apparatus 102 or stores data collected from the apparatus itself or an external apparatus. The storage device 105 stores and accumulates log data to be described later. The storage device 105 is an example of a log data accumulation unit. The storage device 105 is configured using a magnetic disk device or a nonvolatile memory.

The control device 110 is a controller that controls each functional unit of the image processing apparatus 100. The control device 110 is an example of an information processing apparatus. The control device 110 is configured to include a central processing unit (CPU) that is an arithmetic unit, a read only memory (ROM) that stores a program for realizing each control function, and a random access memory (RAM) used as a work area. The control device 110 performs control relevant to an extended function, which is added by a plug-in, in addition to the initially provided basic function for controlling the image input apparatus 101, the image output apparatus 102, the user interface unit 103, the communication interface unit 104, the storage device 105, and the like. Examples of the extended function include a function of collecting data from the apparatus itself or an external apparatus, a function of processing collected data, and a function of transmitting the collected data to the management server 200. Next, the function of the control device 110 will be described in detail.

Configuration of Control Device

Figure 3:
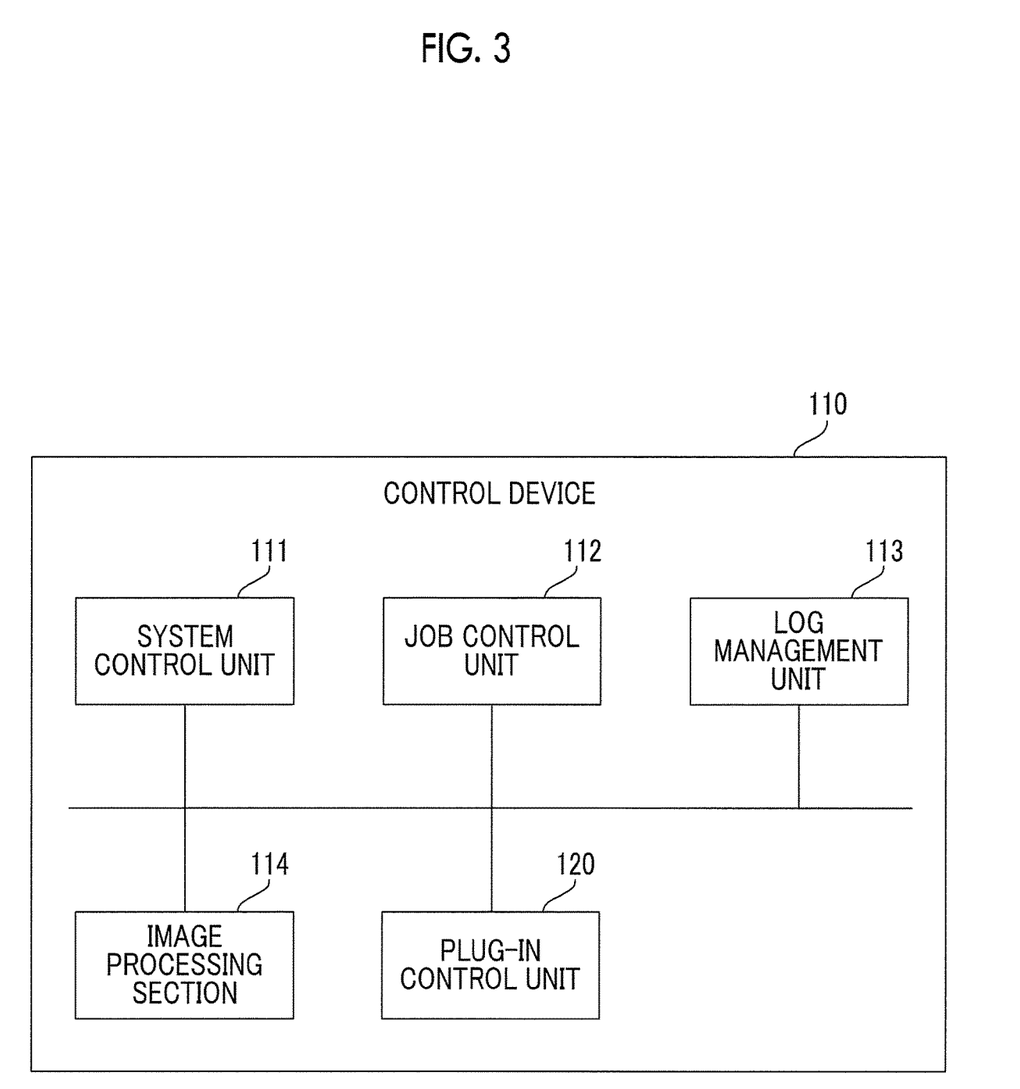
FIG. 3 is a diagram showing the functional configuration of a control device.

FIG. 3 is a diagram showing the functional configuration of the control device 110. The control device 110 includes a system control unit 111, a job control unit 112, a log management unit 113, an image processing section 114, and a plug-in control unit 120.

The system control unit 111 controls the overall operation of the image processing apparatus 100. That is, the system control unit 111 controls the operations of the image input apparatus 101, the image output apparatus 102, the user interface unit 103, the communication interface unit 104, the storage device 105, and the like.

The job control unit 112 controls start, stop, and completion of jobs executed by the image input apparatus 101 or the image output apparatus 102. Specifically, the job control unit 112 controls jobs, such as copy, print, and scan.

The log management unit 113 manages log data of a job (job log data; hereinafter, referred to as job log) executed by the image input apparatus 101 or the image output apparatus 102 and log data of an image file (image log data; hereinafter, referred to as image log) processed by the image input apparatus 101 or the image output apparatus 102. The job log and the image log are managed by the log management unit 113 and stored in the storage device 105.

The image processing section 114 executes various kinds of processing required to form an image in the processing of the image input apparatus 101 or the image output apparatus 102. Examples of the processing required to form an image include color correction and gradation correction. The image processing section 114 (control device 110), and the image input apparatus 101, and the image output apparatus 102 are examples of an image processing unit.

The plug-in control unit 120 controls registration, deletion, and execution of the plug-in received from the plug-in distribution server 300. The plug-in is a program different from firmware, and is used in the case of adding an individual function to firmware that provides common functions. The plug-in control unit 120 also includes a platform for operating the plug-in. For example, Java (registered trademark) virtual machine (VM) is a platform for operating a plug-in written in Java language. The function of the plug-in control unit 120 and the details of the plug-in in the present exemplary embodiment will be described later.

Configuration of Management Server

Figure 4:
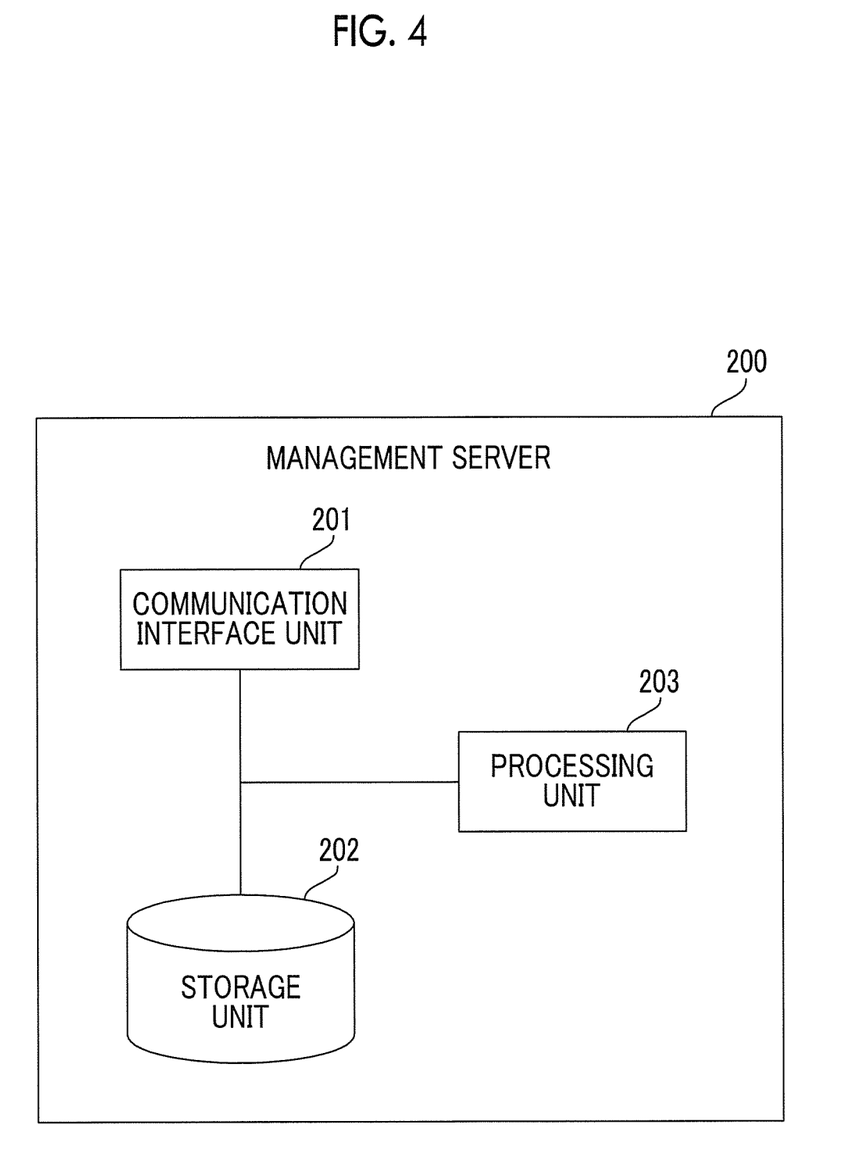
FIG. 4 is a diagram showing the functional configuration of a management server.

FIG. 4 is a diagram showing the functional configuration of the management server 200. The management server 200 includes a communication interface unit 201, a storage unit 202, and a processing unit 203. The communication interface unit 201 is connection means for making a connection with the image processing apparatus 100 through the network 400 in order to exchange data. The storage unit 202 stores the data acquired from the image processing apparatus 100. The processing unit 203 executes processing using the data acquired from the image processing apparatus 100. The management server 200 may be realized by a single server machine, or may be realized by distributing respective functions to a plurality of server machines. Some or all of the functions may be configured as a so-called cloud system.

Configuration of Plug-in Distribution Server

Figure 5:
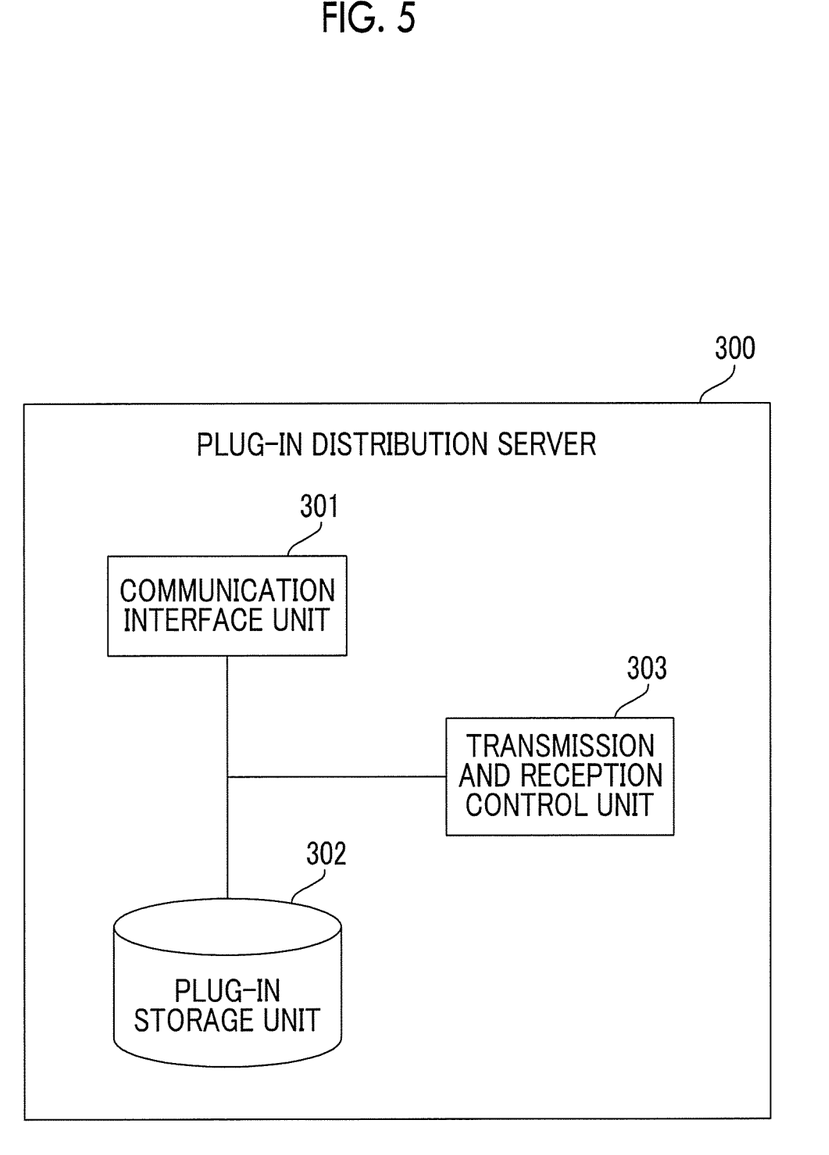
FIG. 5 is a diagram showing the functional configuration of a plug-in distribution server.

FIG. 5 is a diagram showing the functional configuration of the plug-in distribution server 300. The plug-in distribution server 300 includes a communication interface unit 301, a plug-in storage unit 302, and a transmission and reception control unit 303. The communication interface unit 301 is connection means for making a connection with the image processing apparatus 100 through the network 400 in order to exchange data. The plug-in storage unit 302 stores a plug-in that can be registered and executed in the image processing apparatus 100. In response to a request received from the image processing apparatus 100, the transmission and reception control unit 303 reads a plug-in from the plug-in storage unit 302 and transmits the plug-in to the image processing apparatus 100.

Configuration of Plug-in Control Unit

Figure 6:
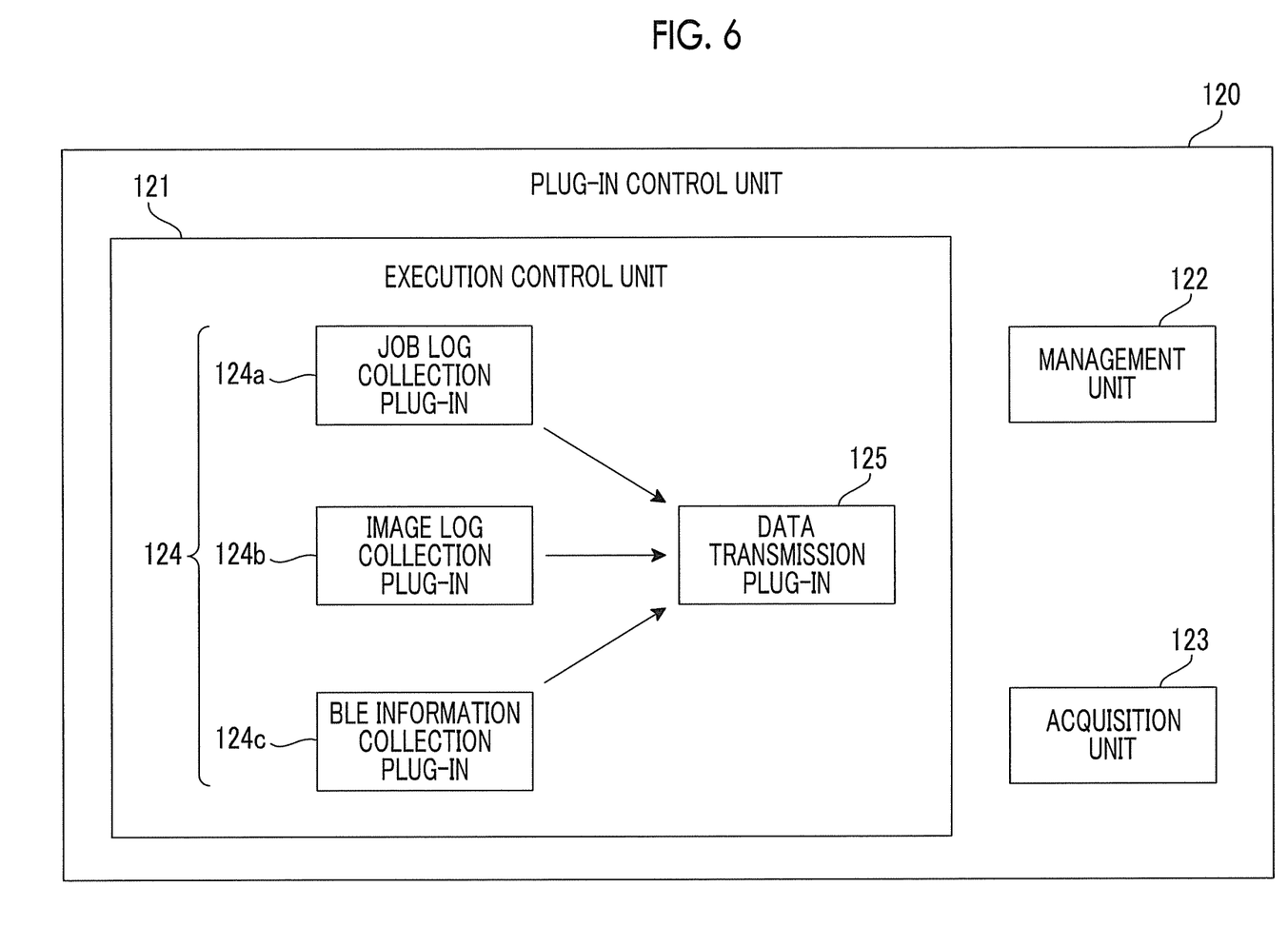
FIG. 6 is a diagram showing the functional configuration of a plug-in control unit.

FIG. 6 is a diagram showing the functional configuration of the plug-in control unit 120. The plug-in control unit 120 includes an execution control unit 121, a management unit 122, and an acquisition unit 123. The plug-in control unit 120 stores a data collection plug-in 124 and a data transmission plug-in 125 as plug-ins that are managed by the management unit 122 and executed by the execution control unit 121. In the following description, in a case where the data collection plug-in 124 and the data transmission plug-in 125 are not distinguished, the data collection plug-in 124 and the data transmission plug-in 125 will be described as a plug-in 124 and a plug-in 125.

The execution control unit 121 controls activation, stop, and execution of processing of each plug-in. That is, the execution control unit 121 activates the plug-ins 124 and 125 according to the activation conditions for each of the plug-ins 124 and 125 and the control conditions for all of the plug-ins 124 and 125, stops the plug-ins 124 and 125 according to the stop conditions for each of the plug-ins 124 and 125, and executes the processing of the plug-ins 124 and 125 according to the execution conditions for each of the plug-ins 124 and 125 and the control conditions for all of the plug-ins 124 and 125. The execution control unit 121 is an example of a plug-in management unit.

The management unit 122 registers the plug-ins 124 and 125 acquired from the plug-in distribution server 300, and manages the states. The management unit 122 may acquire information of the operation states of the plug-ins 124 and 125 from the execution control unit 121 and manage the information for each of the plug-ins 124 and 125.

The acquisition unit 123 acquires the plug-ins 124 and 125 from the plug-in distribution server 300. The acquisition unit 123 transmits a request for acquisition of a required plug-in to the plug-in distribution server 300 in response to an operation or the like by the user received by the user interface unit 103, and acquires the requested plug-ins 124 and 125 in response to the response from the plug-in distribution server 300. The acquired plug-ins 124 and 125 are managed by the management unit 122.

The data collection plug-in 124 is a plug-in having a function of collecting data from the apparatus itself or an external apparatus. The data collection plug-in 124 is an example of a first plug-in, and is an example of a data collection unit. One or a plurality of data collection plug-ins 124 are prepared according to the type of data to be collected or the type of an apparatus that outputs data (data output apparatus). Examples of the data to be collected include a job log as a history of execution jobs and an image log of an image as an image processing target, all of which are data to be collected based on the operation of the apparatus itself. That is, as examples of a data output apparatus in the image processing apparatus 100, the log management unit 113 of the control device 110 and the storage device 105 can be mentioned.

As data to be collected from an external apparatus, there is data acquired by a sensor in an external apparatus, such as a so-called IoT (Internet of Things) apparatus. The external apparatus is an example of a data output apparatus, and is an example of a communication apparatus. Although the communication method for receiving data from the external apparatus is not particularly limited, plug-ins are individually prepared according to the communication method. For example, in the case of receiving data by Bluetooth low energy (BLE) communication, a plug-in for controlling the BLE communication is prepared. In the case of receiving data by Wi-Fi communication, a plug-in for controlling the Wi-Fi communication is prepared. The communication method used to collect data is limited to a communication method supported by the communication interface unit 104 of the image processing apparatus 100.

In the configuration example shown in FIG. 6, a job log collection plug-in 124a and an image log collection plug-in 124b are shown as the data collection plug-in 124 for realizing the function of collecting data from the apparatus itself. As the data collection plug-in 124 for realizing the function of collecting data from the external apparatus, a BLE information collection plug-in 124c for collecting data by BLE communication is shown.

The data transmission plug-in 125 is a plug-in having a function of transmitting the data collected by the data collection plug-in 124 to the management server 200. The data transmission plug-in 125 is an example of a second plug-in, and is an example of a transmission unit. In the configuration example shown in FIG. 6, only one data transmission plug-in 125 is shown, but a plurality of data transmission plug-ins 125 may be provided. In the present exemplary embodiment, however, by providing a plug-in having a data transmission function (data transmission plug-in 125) separately from a plug-in having a data collection function (data collection plug-in 124), data collected by a plurality of data collection plug-ins 124 can be transmitted to the management server 200 by a single data transmission plug-in 125 (or a smaller number of data transmission plug-ins 125 than the number of data collection plug-ins 124). Therefore, in a plug-in prepared according to the type of data to be collected or the type of apparatus (data output apparatus) that outputs data, unlike in a configuration in which the function of collecting information and transmitting the information to the management server 200 is provided by one plug-in, new target data may be collected and transmitted to the management server 200 only by adding a data collection function. As a result, the cost in the case of additionally providing a function is reduced. The details of the data collection plug-in 124 and the data transmission plug-in 125 will be described later.

Function of Data Collection Plug-in

Each data collection plug-in 124 has a data acquisition function and a processing function, and executes processing by these functions under the control of the execution control unit 121. The data collection plug-in 124 acquires data from a target data output apparatus using the data acquisition function. For example, the job log collection plug-in 124a shown in FIG. 6 reads and acquires a job log managed by the log management unit 113 of the control device 110 from the storage device 105 using the data acquisition function. The image log collection plug-in 124b shown in FIG. 6 reads and acquires an image log managed by the log management unit 113 of the control device 110 from the storage device 105 using the data acquisition function. The BLE information collection plug-in 124c shown in FIG. 6 acquires information from the external apparatus by the BLE communication using the data acquisition function.

Each data collection plug-in 124 performs predetermined processing according to the type of collected data using the processing function. For example, the job log collection plug-in 124a shown in FIG. 6 replaces at least a part of data recorded in the job log with a hash value using the processing function. Examples of data to be replaced include a user ID, a uniform resource locator (URL), and a file name. The image log collection plug-in 124b shown in FIG. 6 acquires text data by performing optical character recognition (OCR) processing on the text included in the image recorded in the image log using the processing function. The image log collection plug-in 124b shown in FIG. 6 may further perform statistical processing for examining the appearance state of a specific term (keyword) or expression with respect to the text data acquired by the OCR processing using the processing function. The image log collection plug-in 124b shown in FIG. 6 removes information specifying a communication apparatus that has transmitted data, such as a manufacturer name or a model name, from the data acquired from the external apparatus using the processing function.

The data collection plug-in 124 may acquire data by the data acquisition function according to the state of the processing by the processing function under the control of the execution control unit 121. For example, during the execution of the processing by the processing function, even in a case where the access request from the data output apparatus is received or the timing condition for collecting data is satisfied, data acquisition by the data acquisition function may not be performed and new data acquisition may be performed after the processing by the processing function is ended.

Alternatively, the data collection plug-in 124 may execute the processing according to the state of the hardware resource, which is used in the processing by the processing function, under the control of the execution control unit 121. For example, in a case where the CPU of the control device 110 is used for the processing by the processing function, the processing by the processing function of the data collection plug-in 124 may not be executed during the execution of the image processing by the image processing section 114 (while the CPU is in use), and the processing by the processing function of the data collection plug-in 124 may be executed in a case where the image processing by the image processing section 114 is not being executed.

Function of Data Transmission Plug-in

The data transmission plug-in 125 has an accumulation function and a transmission function, and executes processing by these functions under the control of the execution control unit 121. The data transmission plug-in 125 accumulates the data, which is collected by the data collection plug-in 124 and processed, using the accumulation function. The data is accumulated in, for example, the RAM of the control device 110 or the storage device 105.

The data transmission plug-in 125 transmits the data accumulated by the accumulation function to the management server 200 using the transmission function. Here, the data that is transmitted is processed data in a case where processing is performed by the data collection plug-in 124. For example, according to the example of the processing described above, a job log whose part has been replaced with a hash value, an image log including OCR-processed text data, a result of statistical processing performed on the text data, data from which information specifying the communication apparatus has been removed, and the like are transmitted.

The data transmission plug-in 125 may transmit the data to the management server 200 in accordance with predetermined timing conditions under the control of the execution control unit 121. The timing conditions may be a specific time specified by the real time clock (RTC) or the like. Alternatively, data may be periodically transmitted at predetermined time intervals. Alternatively, the timing of transmission may be set according to the state of the management server 200. For example, in a case where transmission of data cannot be received for reasons such as a heavy load on the management server 200, the data transmission plug-in 125 may transmit data again after a predetermined period of time has passed.

The data transmission plug-in 125 accumulates data by the accumulation function before the data is transmitted to the management server 200 by the transmission function and transmits the data by the transmission function, and then deletes the data.

As described above, in addition to the operation control by the functions of the plug-ins 124 and 125, the execution control unit 121 may control the activation order of the data collection plug-in 124 in accordance with the predetermined conditions according to the number of data collection plug-ins 124 that are acquired by the acquisition unit 123 and managed by the management unit 122. For example, the activation order of the data collection plug-in 124 for collecting data whose immediacy does not matter, such as a job log or an image log, may be controlled so as to be late, so that the activation of the data collection plug-in 124 for collecting data acquired from the external apparatus is performed first. In addition, the activation order of the data collection plug-in 124 may be controlled using various known methods, such as a round robin method and sequence control using a queue.

Operation of Plug-in Control Unit

Figure 7:
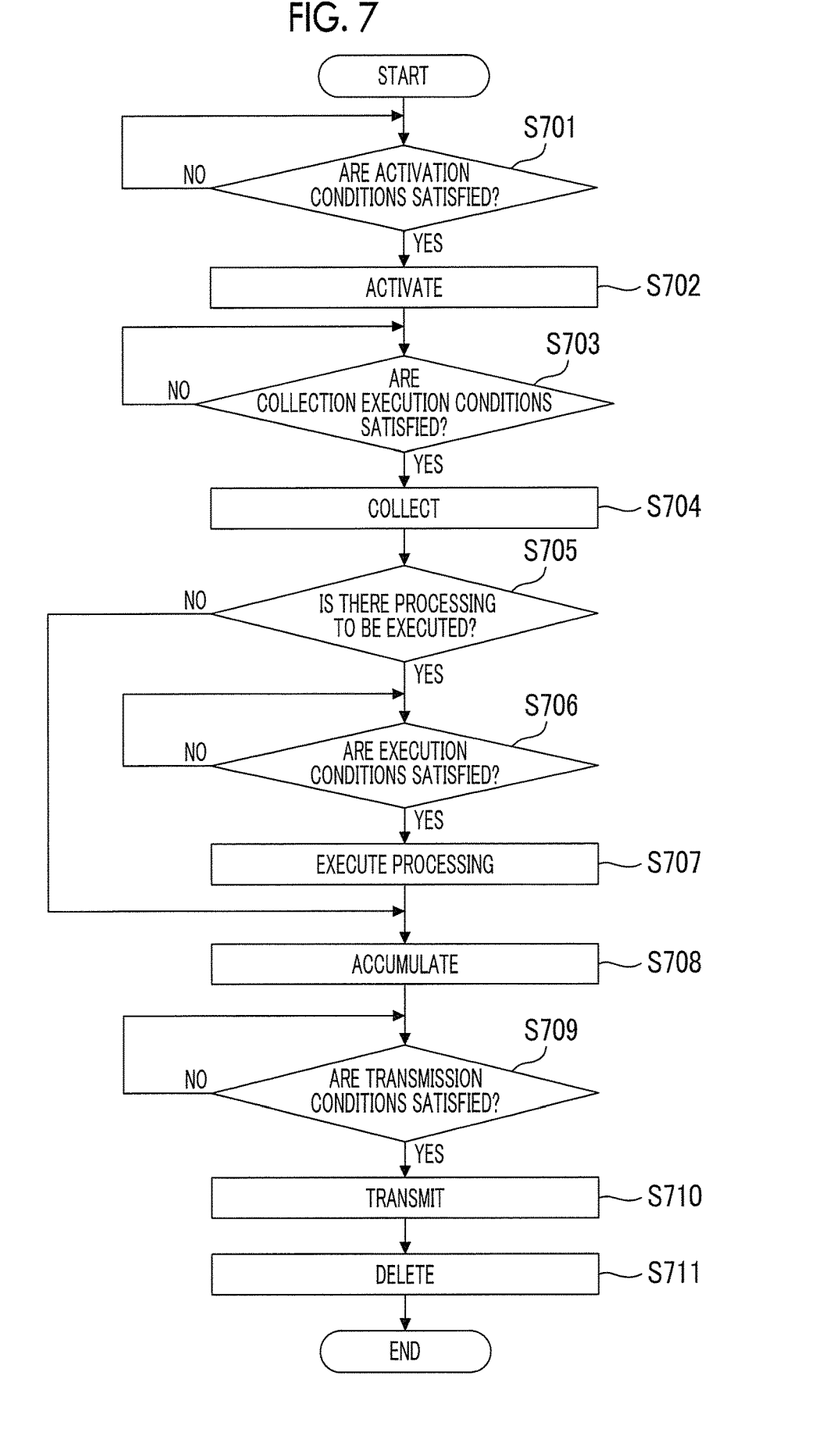

FIG. 7 is a flowchart showing the operation of the plug-in control unit 120 at the time of executing the plug-ins 124 and 125. The execution control unit 121 of the plug-in control unit 120 activates the data collection plug-in 124 satisfying the activation conditions (S701 and S702). The activation conditions may be set individually for each data collection plug-in 124, or may be set as a comprehensive rule. As described above, the activation conditions (activation order and the like) may be set according to the number of data collection plug-ins 124 managed by the management unit 122. In addition, various conditions can be set. Since the data transmission plug-in 125 transmits the data collected by each data collection plug-in 124, the data transmission plug-in 125 may always be in an activation state or may be controlled so as to be activated each time the data collection plug-in 124 is activated.

Then, in a case where the execution conditions of data collection by the activated data collection plug-in 124 are satisfied, the execution control unit 121 collects data (S703 and S704). As described above, for example, the execution conditions are set based on the state of the processing by the processing function of the data collection plug-in 124 itself. In addition, various conditions, such as the operation states of the other data collection plug-ins 124, can be set.

Then, in the case of executing the processing by the processing function in the activated data collection plug-in 124 (in a case where there is processing to be executed), the execution control unit 121 executes the processing by the processing function in a case where the execution conditions of the processing are satisfied (S705, S706, and S707). As described above, for example, the execution conditions may be set based on the state of the hardware resources of the image processing apparatus 100. In addition, various conditions can be set. Depending on the type of the data collection plug-in 124 or the type of collected data, the data acquired by the data acquisition function may be passed to the data transmission plug-in 125 as it is without performing the processing by the processing function.

Then, the execution control unit 121 accumulates the data collected by the data collection plug-in 124 (processed data in a case where processing by the processing function is performed) by the accumulation function of the data transmission plug-in 125 (S708). Then, in a case where the transmission conditions of the accumulated data are satisfied, the execution control unit 121 transmits the accumulated data to the management server 200 by the transmission function of the data transmission plug-in 125 (S709 and S710). As the transmission conditions, for example, as described above, timing conditions set for each piece of transmission data or each data transmission plug-in 125 or conditions based on the state of the management server 200 can be set. In addition, various conditions can be set.

Then, the execution control unit 121 deletes the transmitted data among the pieces of data accumulated by the accumulation function of the data transmission plug-in 125 (S711). Apart from the series of operations, the plug-ins 124 and 125 satisfying predetermined stop conditions among the activated plug-ins 124 and 125 are stopped.

Although the exemplary embodiment of the present invention has been described above, the technical scope of the present invention is not limited to the above-described exemplary embodiment. Various changes or alternatives to components without departing from the scope of the technical idea of the present invention are included in the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a plurality of first plug-ins that are prepared according to a type of a data output apparatus for outputting data and collect data output from the data output apparatus;
a single second plug-in that receives data from the plurality of first plug-ins and transmits the received data to an external apparatus; and
a plug-in management unit that controls activation and stop of the plurality of first plug-ins and the single second plug-in, wherein the single second plug-in is activated in response to determining that at least one of the plurality of first plug-ins is activated,
wherein the single second plug-in is different from the plurality of first plug-ins, and the plurality of first plug-ins and the single second plug-in are executed in the information processing apparatus.

2. The information processing apparatus according to claim 1,
wherein the plurality of first plug-ins have a data acquisition function for acquiring data from the data output apparatus and a processing function for performing predetermined processing according to a type of acquired data.

3. The information processing apparatus according to claim 2,
wherein the plurality of first plug-ins acquire data by the data acquisition function according to a state of processing by the processing function.

4. The information processing apparatus according to claim 2,
wherein, according to a state of a hardware resource used in processing by the processing function, the plurality of first plug-ins execute the processing.

5. The information processing apparatus according to claim 1,
wherein the single second plug-in has an accumulation function for receiving data from the plurality of first plug-ins and accumulating the received data and a transmission function for transmitting the data accumulated by the accumulation function to the external apparatus.

6. The information processing apparatus according to claim 5,
wherein the single second plug-in accumulates data by the accumulation function before the data is transmitted by the transmission function.

7. The information processing apparatus according to claim 6,
wherein the single second plug-in deletes data accumulated by the accumulation function after the data is transmitted by the transmission function.

8. The information processing apparatus according to claim 5,
wherein the single second plug-in transmits data accumulated by the accumulation function in accordance with predetermined timing conditions by the transmission function.

9. The information processing apparatus according to claim 1,
wherein the plurality of first plug-ins execute predetermined processing on collected data according to a type of the collected data.

10. The information processing apparatus according to claim 1,
wherein the plug-in management unit controls an activation order of the plurality of first plug-ins in accordance with predetermined conditions according to the number of prepared first plug-ins.

11. An image processing apparatus comprising:
an image processing unit that performs image processing;
a memory that accumulates log data regarding the image processing of the image processing unit;
a communication interface circuit that receives data transmitted from a communication apparatus;
a plurality of first plug-ins that are prepared for each type of data and that collects the log data accumulated in the memory and the data received by the communication interface circuit; and
a single second plug-in that is different from the plurality of first plug-ins and that receives data from the plurality of first plug-ins and transmits the data to an external apparatus,
wherein the single second plug-in is activated in response to determining that at least one of the plurality of first plug-ins is activated, and the plurality of first plug-ins and the single second plug-in are executed in the information processing apparatus.

12. The image processing apparatus according to claim 11,
    wherein the plurality of first plug-ins performs is predetermined processing according to a type of collected data, and
    the single second plug-in receives data on which the processing has been performed from the plurality of first plug-ins, and transmits the data to the external apparatus.

13. The image processing apparatus according to claim 11,
    wherein the image processing unit outputs job log data of executed processing,
    the memory accumulates the job log data,
    the plurality of first plug-ins replaces at least a part of the job log data collected from the memory with a hash value, and
    the single second plug-in transmits the job log data, of which at least a part has been replaced with a hash value, to the external apparatus.

14. The image processing apparatus according to claim 12,
    wherein the image processing unit outputs image log data including image data of an image that is a target of executed processing,
    the memory accumulates the image log data,
    the plurality of first plug-ins acquires text data by performing OCR processing on the image log data collected from the memory, and
    the single second plug-in transmits the text data to the external apparatus.

15. The image processing apparatus according to claim 14,
    wherein the plurality of first plug-ins performs is predetermined statistical processing on the acquired text data, and
    the single second plug-in transmits a result of the statistical processing to the external apparatus.

16. The image processing apparatus according to claim 12,
    wherein the plurality of first plug-ins removes, among the pieces of data received by the communication interface circuit, at least data specifying the communication apparatus that has transmitted the data, and
    the single second plug-in transmits data, of which at least a part has been removed, to the external apparatus.

17. The image processing apparatus according to claim 11,
    wherein the plurality of first plug-ins performs predetermined processing on collected data in a case where the image processing of the image processing unit is not performed, and
    the single second plug-in receives data on which the processing has been performed from the plurality of first plug-ins, and transmits the data to the external apparatus.

18. The image processing apparatus according to claim 17,
    wherein the single second plug-in accumulates the data received from the plurality of first plug-ins, and transmits the accumulated data to the external apparatus in accordance with predetermined timing conditions.

* * * * *